US011310487B1

(12) United States Patent
Clemens et al.

(10) Patent No.: US 11,310,487 B1
(45) Date of Patent: Apr. 19, 2022

(54) FRUSTUM CHANGE IN PROJECTION STEREO RENDERING

(71) Applicant: Tanzle, Inc., Scotts Valley, CA (US)

(72) Inventors: Nancy L. Clemens, Scotts Valley, CA (US); Michael A. Vesely, Scotts Valley, CA (US)

(73) Assignee: Tanzle, Inc., Scotts Valley, CA (US)

( * ) Notice: Subject to any disclaimer, the term of this patent is extended or adjusted under 35 U.S.C. 154(b) by 66 days.

(21) Appl. No.: 16/866,385

(22) Filed: May 4, 2020

Related U.S. Application Data

(63) Continuation of application No. 16/779,353, filed on Jan. 31, 2020, now Pat. No. 10,652,528, which is a
(Continued)

(51) Int. Cl.
*H04N 13/366* (2018.01)
*H04N 13/117* (2018.01)
(Continued)

(52) U.S. Cl.
CPC ........... *H04N 13/366* (2018.05); *G06T 15/20* (2013.01); *H04N 13/117* (2018.05); *H04N 13/128* (2018.05)

(58) Field of Classification Search
CPC .. H04N 13/366; H04N 13/128; H04N 13/117; G06T 15/20
See application file for complete search history.

(56) References Cited

U.S. PATENT DOCUMENTS

| 5,663,831 A | 9/1997 | Mashitani et al. |
| 8,643,569 B2 | 2/2014 | Vesely |

(Continued)

FOREIGN PATENT DOCUMENTS

| WO | WO 2015/010049 | 1/2015 |

OTHER PUBLICATIONS

Berlinger ("Combining Perspective and Orthographic Camera for Parallax Effect in 2D Game, 2016," https://www.gamedeveloper.com/programming/combining-perspective-and-orthographic-camera-for-parallax-effect-in-2d-game) (Year: 2016).*
(Continued)

*Primary Examiner* — Xin Sheng
(74) *Attorney, Agent, or Firm* — Fish & Richardson P.C.

(57) ABSTRACT

A system, method or compute program product for restricting convergence and divergence when viewing stereo 3D imagery. The technique includes receiving data representing a 3D virtual scene, receiving data indicating an eyepoint and a three-dimensional frustum rendering region with the three dimensional frustum rendering region identifying a position and orientation of a render plane, receiving data indicating a user stereo comfort region, rendering virtual objects in a first portion of the 3D virtual scene that is in the three-dimensional frustum rendering region and within the user stereo comfort region onto the render plane according to a first type of projection, and rendering virtual objects in a second portion of the 3D virtual scene that is in the three-dimensional frustum rendering region and outside the user stereo comfort region onto the render plane according to a different second type of projection.

20 Claims, 12 Drawing Sheets

Related U.S. Application Data continuation of application No. 16/576,635, filed on Sep. 19, 2019, now Pat. No. 10,616,567.

(60) Provisional application No. 62/734,955, filed on Sep. 21, 2018.

(51) Int. Cl.
*H04N 13/128* (2018.01)
*G06T 15/20* (2011.01)

(56) References Cited

U.S. PATENT DOCUMENTS

| | | | |
|---|---|---|---|
| 9,123,171 | B1 | 9/2015 | Chavez et al. |
| 9,202,306 | B2 | 12/2015 | Vesely et al. |
| 9,380,295 | B2 | 6/2016 | Dolim et al. |
| 9,681,122 | B2 | 6/2017 | Wilson et al. |
| 2009/0160931 | A1* | 6/2009 | Pockett ............ H04N 13/25 348/42 |
| 2012/0127155 | A1 | 5/2012 | Deshpande |
| 2013/0127889 | A1* | 5/2013 | Winnemoeller ...... G06T 11/001 345/582 |
| 2014/0313295 | A1 | 10/2014 | Dolim et al. |
| 2015/0156470 | A1 | 6/2015 | Didyk et al. |
| 2016/0191888 | A1* | 6/2016 | Blonde ............ H04N 13/128 348/43 |
| 2016/0267707 | A1 | 9/2016 | Vesely et al. |
| 2017/0272733 | A1 | 9/2017 | Taniguichi et al. |

OTHER PUBLICATIONS

Lei, Jianjun, et al. "Projection-based disparity control for toed-in multiview images." Optics express 22.9 (2014): 11192-11204. (Year: 2014).*

Shibata, T., et al. "The zone of comfort: Predicting visual discomfort with." (2011). (Year: 2011).*

Park, et al., "View Image Generation in Perspective and Orthographic Projection Geometry Based on Integral Imaging," Optics Express, 2008, 16(12):8800-8813.

Shibata et al., "The Zone of Comfort: Predicting Visual Discomfort with Stereo Displays," Journal of Vision, 2011, 11(8):11, 1-29.

Shibuhisa et al., "Study on Reducing the Cardboard Effect for Natural Perception Using Adaptive Disparity Mapping," SID 2012 Digest, pp. 961-964.

Terzić and Hansard, "Method for Reducing Visual Discomfort in Stereoscopic 3D: A Review," Signal Processing: Image Communication, 2016, 47:402-416.

\* cited by examiner

FRUSTUM CHANGE IN PROJECTION STEREO RENDERING

CROSS-REFERENCE TO RELATED APPLICATIONS

This application is a continuation of U.S. patent application Ser. No. 16/779,353, filed on Jan. 31, 2020, which is a continuation of U.S. patent application Ser. No. 16/576,635, filed on Sep. 19, 2019 (now U.S. Pat. No. 10,616,567), which claims priority to U.S. Application Ser. No. 62/734,955, filed on Sep. 21, 2018, the disclosures of which are incorporated by reference.

BACKGROUND

Technical Field

This disclosure relates to a three-dimensional display system, and in particular, to a display process to render virtual objects in a visualized three dimensional space reflecting the data presented to the rendering system.

Description of Related Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g., paintings, drawings, tapestries, etc.).

The two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g., height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

Viewing stereoscopic content on planar stereoscopic display sometimes triggers unpleasant feelings of discomfort or fatigue in the viewer. The discomfort and fatigue may be, at least in part, caused by limitations of existing planar stereoscopic displays. A planar stereoscopic display, no matter whether LCD based or projection based, shows two images with disparity between them on the same planar surface. By temporal and/or spatial multiplexing the stereoscopic images, the display results in the left eye seeing one of the stereoscopic images and the right eye seeing the other one of the stereoscopic images. It is the disparity of the two images that results in viewers feeling that they are viewing three dimensional scenes with depth information. This viewing mechanism is different from how eyes normally perceive natural three dimensional scenes, and may causes a vergence-accommodation conflict. The vergence-accommodation conflict strains the eye muscle and sends confusing signals to the brain, and eventually cause discomfort/fatigue.

Another solution, at least in part, is based upon signal processing. The signal processing manipulates the stereoscopic image pair sent to the planar stereoscopic display in some manner, e.g., adjusting the color gamut or contrast of the image pair. Although the signal processing cannot fundamentally completely solve the problem, the vergence-accommodation conflict can be significantly reduced and thereby reduce the likelihood of discomfort and/or fatigue.

What is desired is a display system and processing technique that reduces the discomfort and/or fatigue for stereoscopic images.

SUMMARY

In one aspect, a computer program product, method or display system will receive data representing a 3D virtual scene, receive data indicating an eyepoint and a three-dimensional frustum rendering region with the three dimensional frustum rendering region identifying a position and orientation of a render plane, receive data indicating a user stereo comfort region, render virtual objects in a first portion of the 3D virtual scene that is in the three-dimensional frustum rendering region and within the user stereo comfort region onto the render plane according to a first type of projection, and render virtual objects in a second portion of the 3D virtual scene that is in the three-dimensional frustum rendering region and outside the user stereo comfort region onto the render plane according to a different second type of projection.

In another aspect, a computer-implemented method for restricting convergence and divergence when viewing stereo 3D imagery includes identifying a frustum with near and first and second clipping planes, and establishing a first projection matrix within the first far clipping plane and a second projection matrix after the first far clipping plane.

Optionally the first projection matrix within the first far clipping plane may be expand or decrease to a vanishing point and the second projection matrix after the first far clipping plane may maintain a constant and static projection.

Optionally the projection matrix for each clipping plane may be distinct from the projection matrix from the previous clipping plane.

Optionally the near clipping plane may actually be multiple near clipping planes, and the projection matrix for each clipping plane may be distinct from the projection matrix from the previous clipping plane.

BRIEF DESCRIPTION OF THE DRAWINGS

A better understanding of the present disclosure can be obtained when the following detailed description of the preferred embodiment is considered in conjunction with the following drawings, in which.

DETAILED DESCRIPTION

Figure 1:
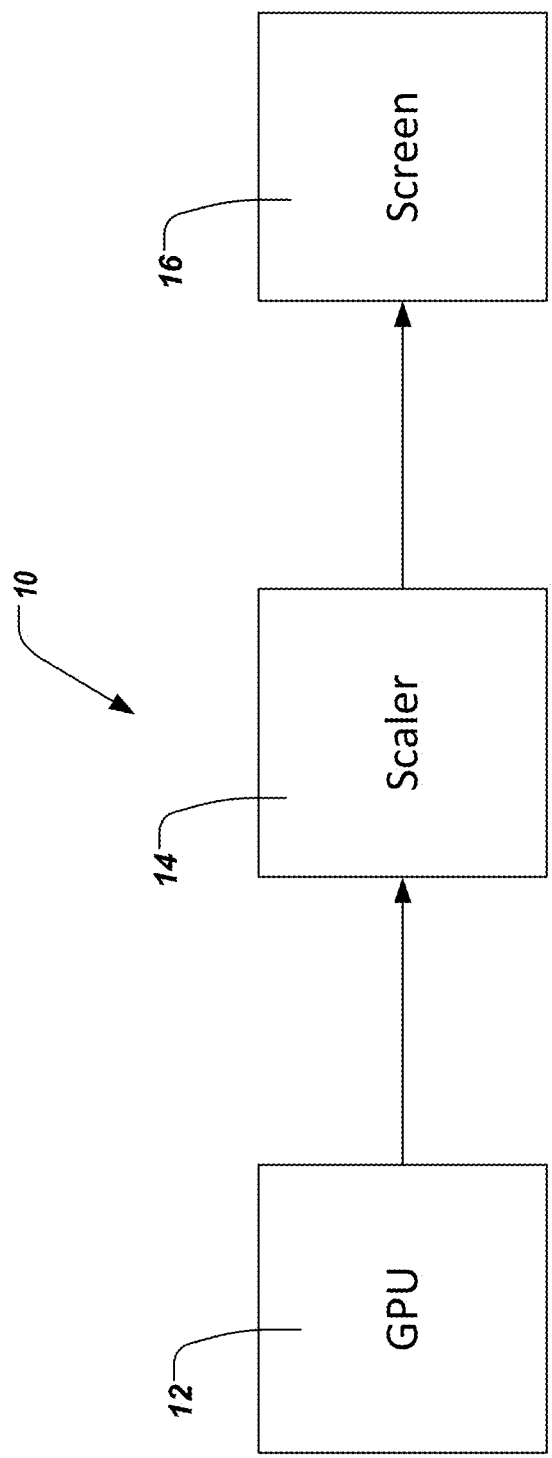
FIG. 1 presents a prior art display chain.

FIG. 1 illustrates a typical conventional display chain 10, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.

3. Panel. The panel 16 is the display screen itself, typically a liquid crystal display (LCD) screen, but other display screens are possible.

Time Sequential Stereo Displays

Unlike a normal display, in a stereo display, there are two images—right and left. The right image is to be delivered to only the right eye, and the left image is to be delivered to only the left eye. In a time sequential stereo display, this separation of right and left images is performed in time, and thus, it must contain some time-dependent element which separates these two images. There are two common architectures.

Figure 2:
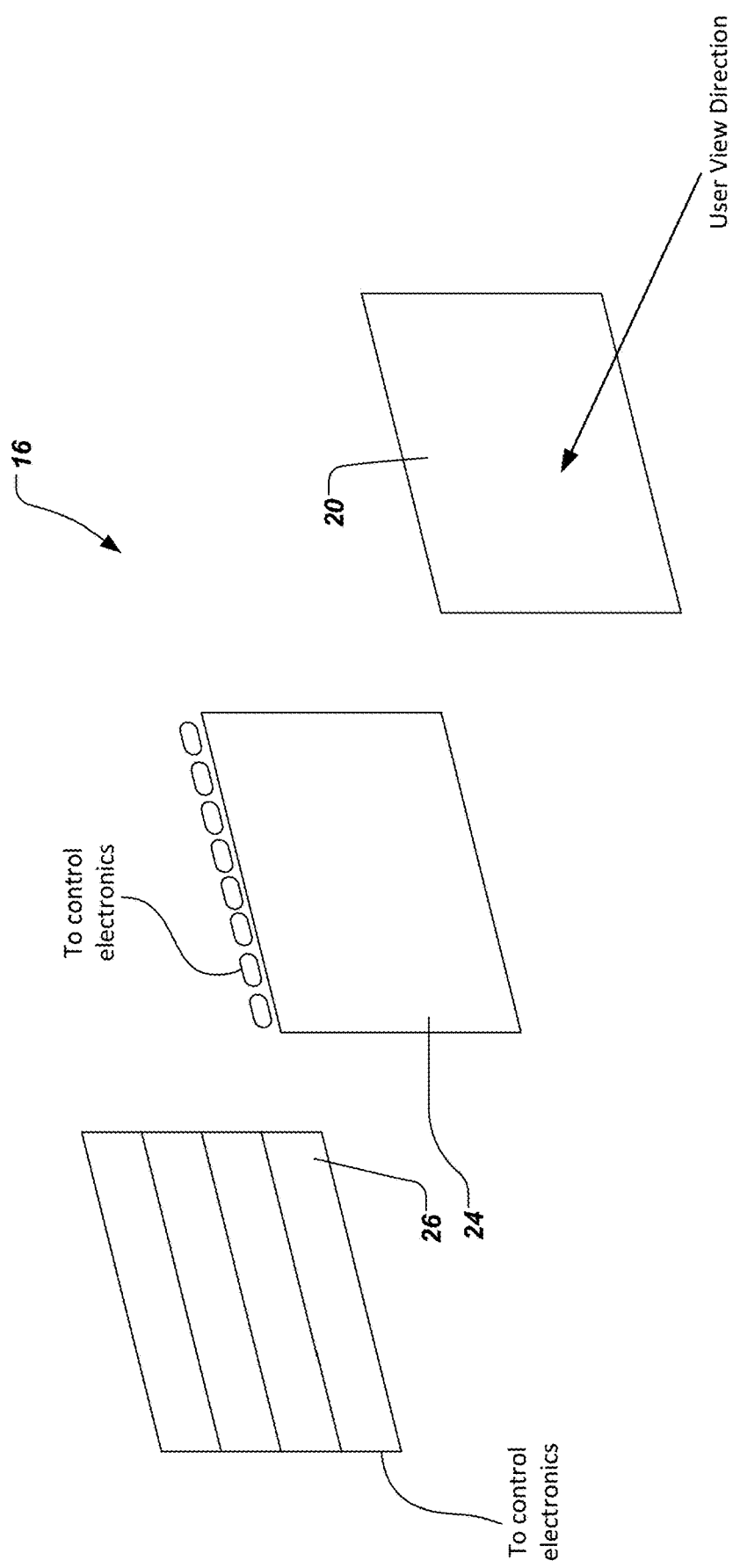
FIG. 2 presents a prior art polarization switch architecture.

The first architecture, shown in FIG. 2, uses a device called a polarization switch (PS) 20 which may be a distinct (separate) or integrated LC device or other technology switch. The polarization switch 20 is placed in front of the display panel 24, specifically between the display panel 24 and the viewer. The display panel 24 can be an LCD panel which can be backlit by a backlight unit 26, or any other type of imaging panel, e.g., an organic light emitting diode (OLED) panel, a plasma display, etc., or any other pixelated panel display used in a time-sequential stereo imaging system. The purpose of the polarization switch 20 is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

Figure 3:
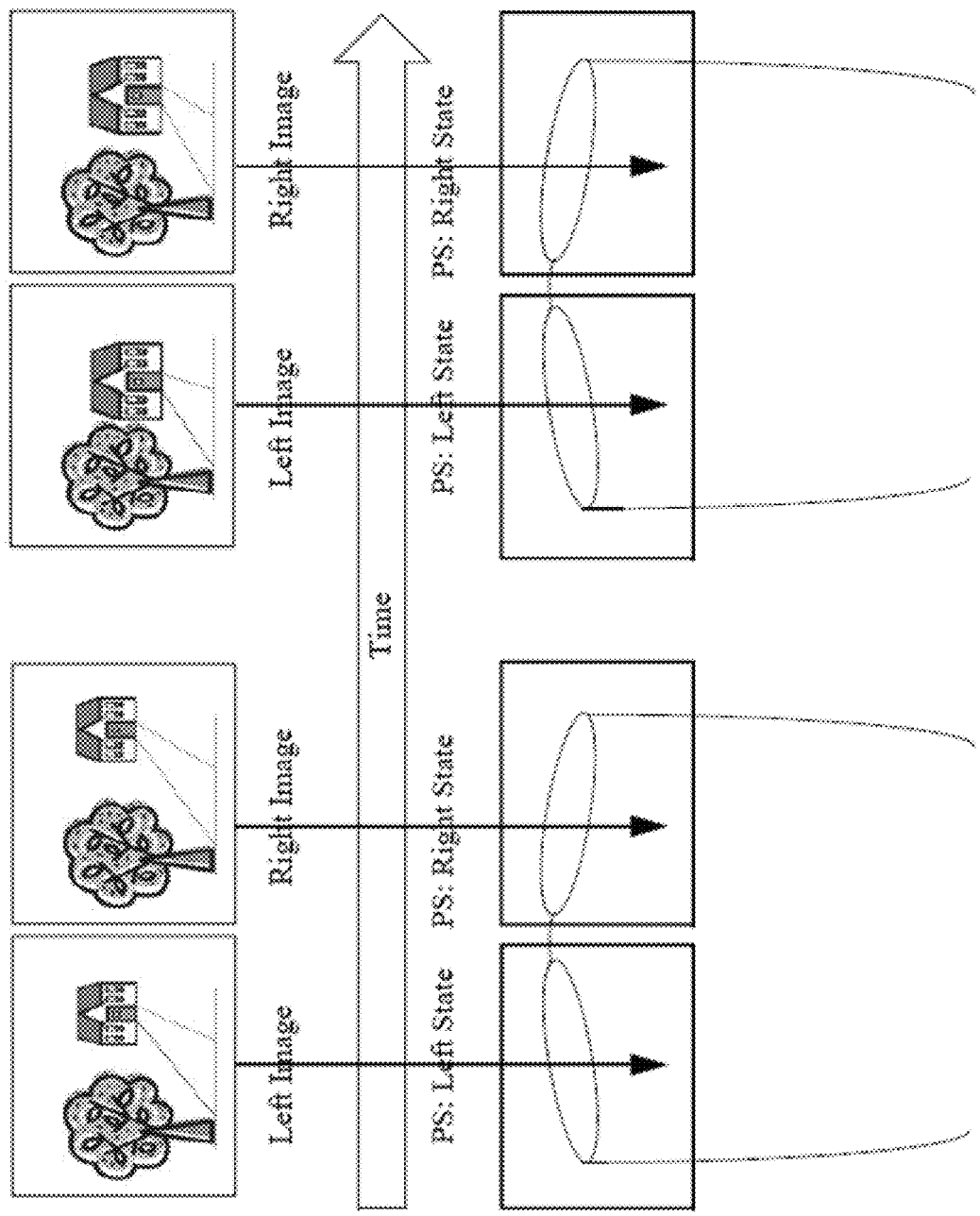
FIG. 3 presents prior art left and right switching views causing a stereo 3D effect.

This allows achievement of the stereo effect shown in FIG. 3. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization and the right lens will only pass the Right State polarization. In this way, separation of the right and left images is achieved.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

Stereo Comfort Fuse Zone

Figure 4:
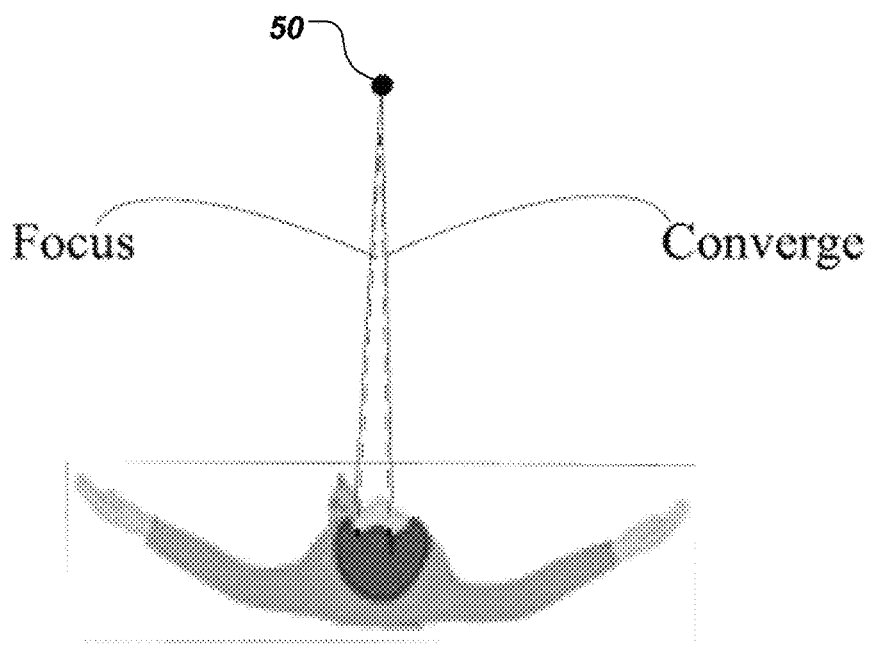
FIG. 4 presents prior art of a person focusing and converging on an object.

As used herein, the term "stereo comfort fuse zone" refers to a physical volume in which the user of a 3D stereoscopic display can view 3D content within the human eye's comfort depth of field. As shown in FIG. 4, when a person sees an object (represented by point 50) in the physical world, the person's eyes verge (e.g., converge or diverge), or look at, the object. Additionally, as the two eyes converge on the object, each eye's lens also focuses on the object. In this sense, both eyes focus and converge on the object.

Figure 5:
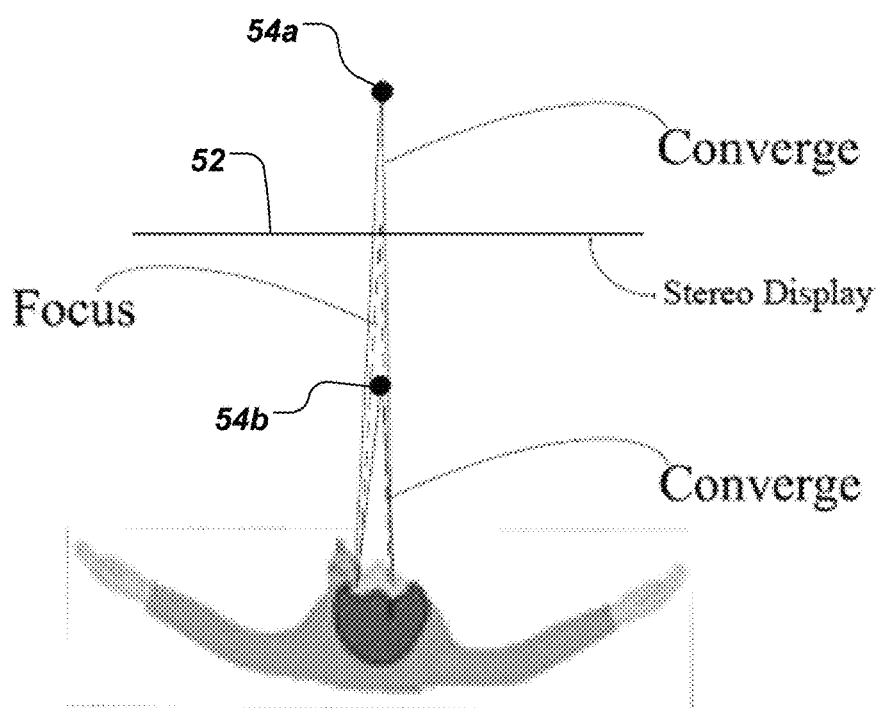
FIG. 5 presents prior art of a person focusing on a 3D stereoscopic display while converging on virtual content in front of the display.

In contrast, as shown in FIG. 5, when looking at a 3D stereoscopic display, focus must always remain on the 3D stereoscopic display focal plane 52, whereas the eyes must converge or diverge at various depths in order to visualize, or see, the imaged objects (represented by points 54a, 54b) within a scene to provide the 3D illusion. Note that if focus and vergence are outside a comfort zone, which can vary depending on the viewer, the display device and the virtual object to be viewed, for a period of time then the viewer may develop eye strain.

Figure 6:
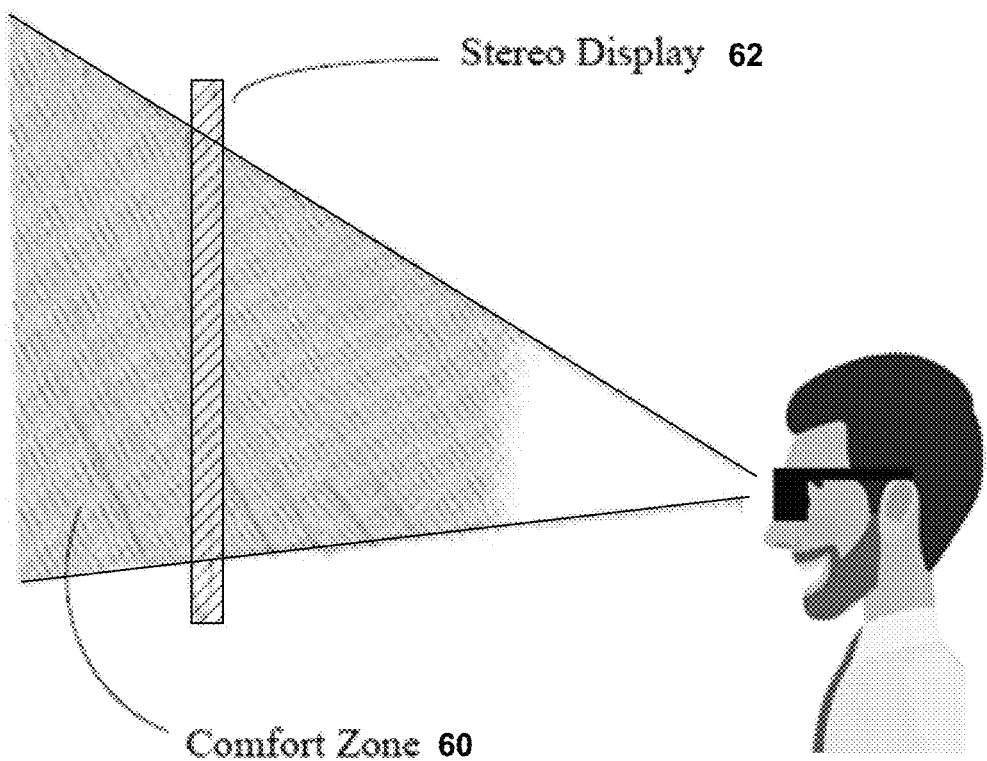
FIG. 6 presents prior art of a stereo 3D display comfort.

However, as shown in FIG. 6, there is a stereo comfort fuse zone 60, that is a physical volume (illustrated by the shaded area in the drawing) which may extend a distance in front of and behind a 3D stereoscopic display 62, in which focus and vergence remain in a comfort zone. In other words, there is a zone based on the human eye's natural depth of field where focus and vergence may not be fully fused but in which objects may be viewed for an extended period of time without resulting eye strain. Put another way, assuming the display plane and the screen of the display are coplanar, the "stereo comfort fuse zone" of a 3D stereoscopic display may refer to a volume defined by a user's viewing angle, the size of the 3D stereoscopic display, and the distance in front of and behind the 3D display plane in which a user may view objects for an extended period of time without developing eye strain. Thus, the comfort fusing zone of a particular 3D stereoscopic display may also be referred to as the "comfort zone" of the particular 3D stereoscopic display.

Improved techniques for enhancing the stereo comfort fuse zone of 3D stereoscopic displays are desired.

Terms

The following is a list of terms used in the present application:

Memory—may include non-transitory computer readable media, including volatile memory, such as a random access memory (RAM) module, and non-volatile memory, such as a flash memory unit, a read-only memory (ROM), or a magnetic or optical disk drive, or any other type of memory unit or combination thereof. Memory is configured to store any software programs, operating system, drivers, and the like, that facilitate operation of display system, including software applications, rendering engine, spawning module, and touch module.

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays, which may or may not include an array of display devices.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a Memory.

Viewpoint—This term has its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, the term "viewpoint" may encompass a the view from a single eye two points of view from a pair of eyes. A "single viewpoint" may specify that the viewpoint refers to only a single point of view, and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene.

Eyepoint—the physical location (and/or orientation) of a single eye or a pair of eyes. A viewpoint may correspond to the eyepoint of a person. For example, a person's eyepoint has a corresponding viewpoint.

Normal Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point.

As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Oblique Perspective—a perspective which is rendered from a viewpoint which is not perpendicular to the display surface. More particularly, the term "oblique perspective" may typically refer to a perspective which is rendered using a substantially render plane greater than or less than 85-95 degrees in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a oblique perspective may apply to a single image or a stereoscopic image. When used with respect to a stereoscopic image (e.g., presenting a stereoscopic image according to a oblique perspective), each image of the stereoscopic image may be presented according to the oblique perspective, but with differing single viewpoints.

Depth of Field—the appearance of relative image sharpness in the objects in the scene toward which the dioptric range for which the retinal image quality does not change appreciably . . . the range of distances in object space within which an image appears in sharp focus, and is specified in meters (m).

Depth of Focus—range of distances in image space within which an image appears in sharp focus.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint and/or object within a scene or the scene itself.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Carrier Medium—a Memory as described above, as well as a physical transmission medium, such as a bus, network, and/or other physical transmission medium that conveys signals such as electrical, electromagnetic, or digital signals.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Stereo comfort fuse zone—refers to a physical volume in which the user of a 3D stereoscopic display can view 3D content within the human eye's natural depth of field. As shown in FIG. 4, when a person sees an object in the physical world, the person's eyes converge, or look at, the object. Additionally, as the two eyes converge on the object, each eye's lens also focuses on the object. In this sense, both eyes focus and converge on the object, thus focus and convergence are "coupled."

Disparity—refers to the difference between the left eye and right eye images of a 3D stereoscopic display. Disparity may be described in at least two ways. First, when referring to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, when referring to the point of view of the user, disparity may be described by the degree of angular separation between corresponding positions in the images, or content, being displayed, or rendered. In other words, the angular separation between the left eye and right eye images, or content.

Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view, or eyepoint, of a user.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Exemplary System

Figure 7:
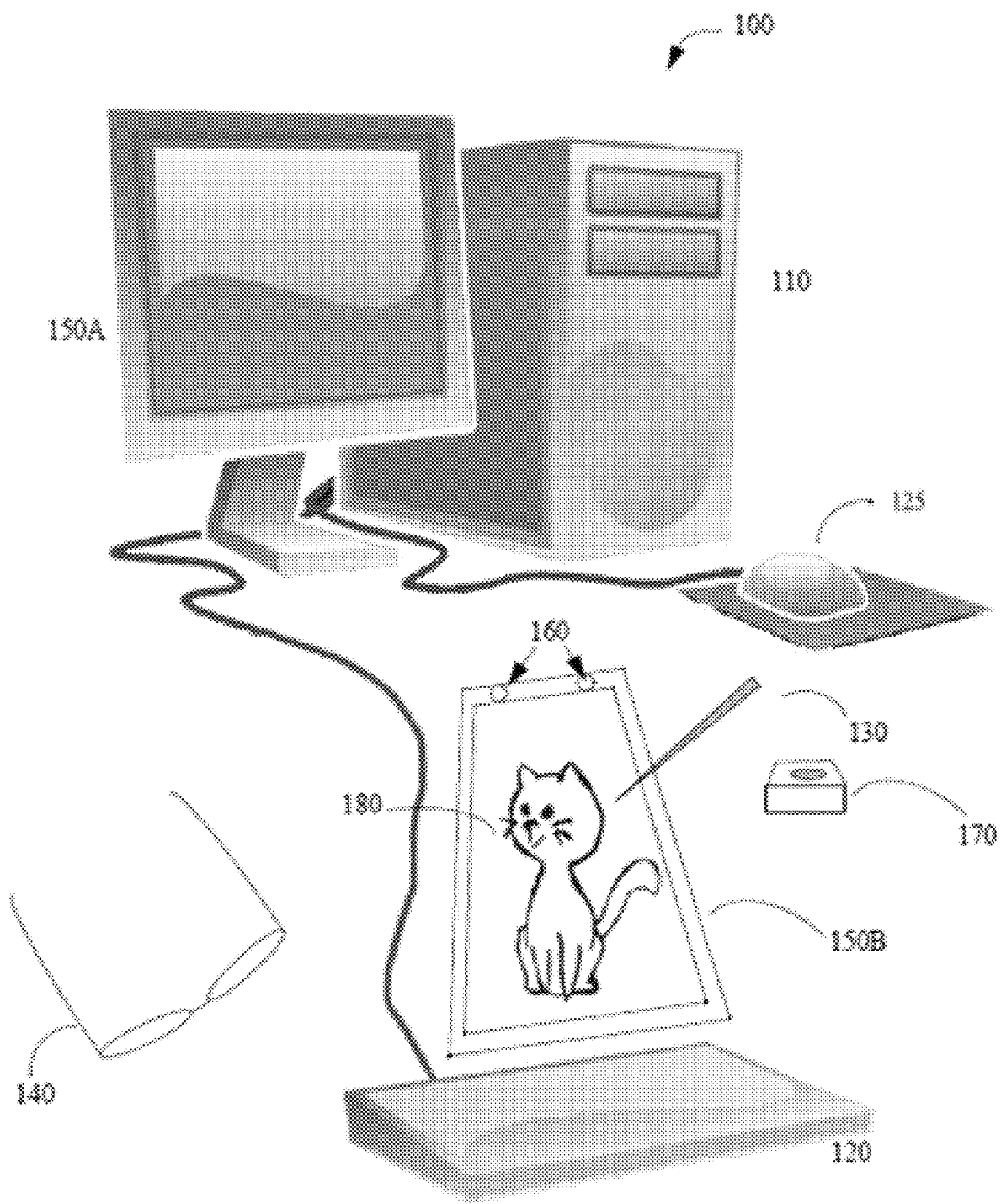
FIG. 7 presents an exemplary system configured which implements various embodiments.

FIG. 7 illustrates an exemplary system that may be configured to perform various embodiments described below.

In the embodiment of FIG. 7, computer system 100 may include a chassis 110, a first display 150A and a second display 150B (which may collectively be referred to as display 150 or "at least one display" 150), a keyboard 120, a mouse 125, a stylus 130, eyewear 140, at least two cameras 160, and stylus caddy 170. Note that in some embodiments, two displays 150A and 150B may not be presented; instead, a single display 150 may be used in such embodiments. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, memory (e.g., RAM, ROM, hard drives, etc.), graphics circuitry, audio circuitry, and other circuitry for performing computer tasks, such as those described herein. The at least one memory may store one or more computer programs or software components according to various embodiments of the present invention. For example, the memory may store one or more graphics engines which are executable to perform some of the techniques described herein. In certain embodiments the graphics engine may be implemented on or be a functional unit, or processing element. As used herein, the term functional unit, or processing element, refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory may also store data (e.g., a computer model) representing a virtual space, which may be used for projecting a 3D scene, such as scene 180, of the virtual space via the display(s) 150. Further, the memory may store software which are executable to perform three-dimensional spatial tracking (e.g., user view tracking, user control tracking, etc.), content processing, or other features, as described herein. Additionally, the memory may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to displaying a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display.

It should be noted that the embodiment of FIG. 7 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the computer system 100) to provide images which are presented according to a vertical (or central) perspective and the display 150B may be used (e.g., via instructions sent by a graphics engine executing in the computer system 100) to provide images which are presented according to a oblique perspective. Descriptions of horizontal and vertical perspectives are provided herein. Additionally, while the displays 150 are shown as flat panel displays, they may be any type of system which is capable of displaying images, e.g., projection systems. For example, displays 150 may be, for example, a CRT (cathode ray tube) monitor, a LCD (liquid crystal display) monitor, a front projection or a back projection screen or surface with a plurality of projectors. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear eyewear 140.

Eyewear 140 may be anaglyph glasses, polarized glasses, shutter glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shutter glasses, each lens is synchronized to alternations of left and right eye images provided by the display(s) 150. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the eyepoint(s) of the user, e.g., via triangulation. The position input device may include an infrared detection system to detect the position of the viewer's head to allow the viewer freedom of head movement or use a light sensitive detection system. Other embodiments of the input device may be the triangulation method of detecting the viewer eyepoint location, such one or more sensors (e.g., two cameras, such as CCD cameras) providing position and/or orientation data suitable for the head tracking. The input device may be manually operated by the viewer, such as a keyboard, mouse, trackball, joystick, or the like, to indicate the correct display of the oblique perspective display images. However, any method for tracking the position of the user's head or eyepoint may be used.

Accordingly, the 3D scene may be rendered from the perspective of the user such that user may view the 3D scene with minimal distortions (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint. The eyepoint to display position and/or orientation relationship may be determined using the display device as the reference for the position of the eyepoint to the display. In another embodiment, an external reference or set of references may correlate the position of the eyepoint to the display position and orientation, where the external reference may know the position and orientation of the display and the position and orientation of the eyepoints and from that distinct knowledge of both can correlate the eye point position/orientation to the display position/orientation.

The relationship among the position/orientation of the display(s) 150 and the eye(s) position of the user may be used to map a portion of the virtual space to the physical space of the system 100. In essence, the physical space and components used are to be mapped to the virtual model in order to accurately render a 3D scene of the virtual space.

One or more of the user input devices (e.g., the keyboard 120, the mouse 125, the stylus 130, pointing device, user control device, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with "open space" portions of the 3D scene. Thus, at least a portion of the 3D scene may be presented in this "open space", which is in front of or otherwise outside of the at least one display 150. And at least a portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). This "open space" may be referred to as a "hands-on volume" as opposed to an "inner-volume", which may be under the surface of the display(s). Thus, the user may interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools such as stylus 130. That is, they may be manipulated indirectly, e.g., via a computer mouse, a joystick, or virtual representations of hands, handheld tools, or a stylus.

In some embodiments, system 100 may include one or more sensors 160. FIG. 7 illustrates an embodiment using multiple cameras 160. For instance, two o cameras 160 may be used to sense a user view (e.g., eyepoint or point of view). Alternatively or addition, cameras 160 may be used to sense a user control (e.g., pointing device, stylus, hand, glove, etc.). Sensors 160 may be used to image a user of system 100, track a user's movement, or track a user's head or eyes. In one embodiment, cameras 160 may track a position and an orientation of stylus 130. The information regarding the position and/or orientation of the stylus 130 provided by the one or more sensors 160 may be used in conjunction with other positional information of the system (e.g., an accelerometer and/or gyroscope within the stylus itself) to perform more precise 3D tracking of the stylus 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store stylus 130. Caddy 170 may also be used to calibrate the orientation of the stylus to a known roll, pitch, and yaw. Caddy 170 may be in a fixed position relative to cameras 160.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the computer system 100 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically, at run-time and may be performed in real time. The 3D scene generator may also keep track of peripheral devices (e.g., stylus 130 or eyewear 140) to ensure synchronization between the peripheral device and the displayed image. The system may further include a calibration unit to ensure the proper mapping of the peripheral device to the display images and proper mapping between the projected images and the virtual images stored in the memory of the computer system 100.

Thus, the system 100 may present a 3D scene which the user may interact with in real time. The system may comprise real-time electronic display(s) 150 that may present or convey perspective images in the open space and a peripheral device 130 that may allow the user to interact with the 3D scene with hand controlled or hand-held tools. The system 100 may also include means to manipulate the displayed image such as magnification, zoom, rotation, movement, and even display a new image.

Further, while the system 100 is shown as including horizontal display 150B since it simulates the user's visual experience with the horizontal ground, any viewing surface could offer similar 3D illusion experience. For example, the 3D scene may appear to be hanging from a ceiling by projecting the oblique perspective images onto a ceiling surface, or appear to be floating from a wall by projecting oblique perspective images onto a vertical wall surface. Moreover, any variation in display orientation and perspective (or any other configuration of the system 100) are contemplated.

Figure 8A:
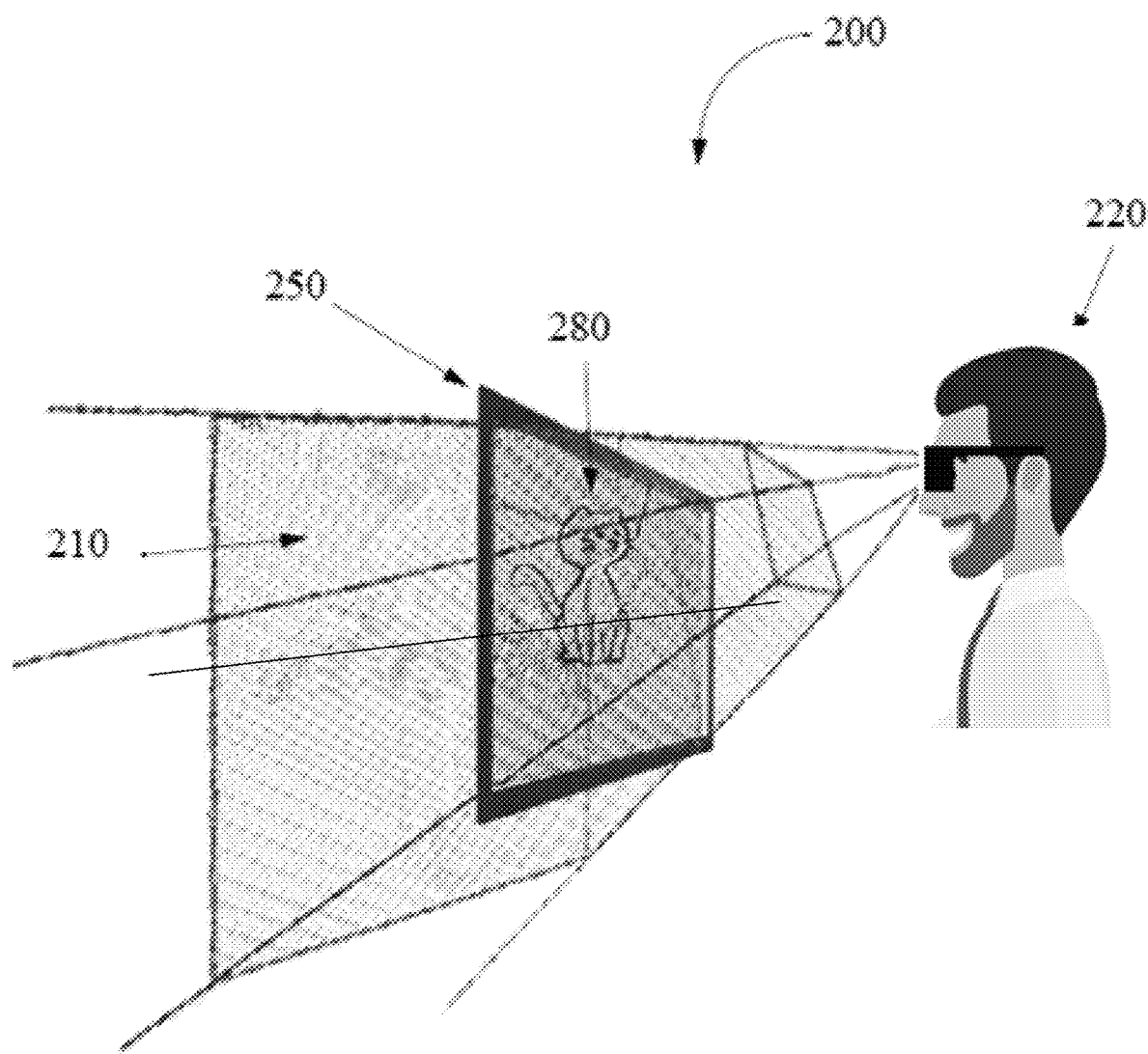
FIGS. 8A-8C present a sample system displaying various embodiments of 3D content.

Thus, as illustrated in FIG. 8A, in an exemplary embodiment, a 3D stereoscopic display system 200, which may be similar to or the same as system 100 described above, may be configured to display 3D stereoscopic content 280 within a stereo comfort fuse zone 210 using 3D stereoscopic display 250. As used herein, the term stereo comfort fuse zone refers to a physical volume in which the user, such as user 220, of a 3D stereoscopic display can view 3D content, such as content 280, within the human eye's comfortable fusing volume. The stereo comfort fuse zone may extend to both the front of, or above the 3D stereoscopic display 250 and the inner volume (behind, or below the 3D stereoscopic display 250).

In such embodiments, a functional unit of display system 200 may be configured to determine the geometry, i.e., the size and shape, of stereo comfort fuse zone 210 of 3D stereoscopic display 250. Note that the stereo comfort fuse zone 210 may include a physical volume that may be specified by the depth of field of user 220 with respect to the position of 3D stereoscopic display 250 and the point of view, or eyepoint, of user 220. Note further that the physical volume of the stereo comfort fuse zone 220 may correspond to at least a portion of a virtual 3D space that may be displayed or rendered using 3D stereoscopic display system 200. The stereo comfort fuse zone may be further determined by the size of the display, the resolution of the display, the dynamic range and/or contrast ratio of the display, the stereo ghosting characteristics of the display as well as the physiological characteristics of the user.

Figure 8B:
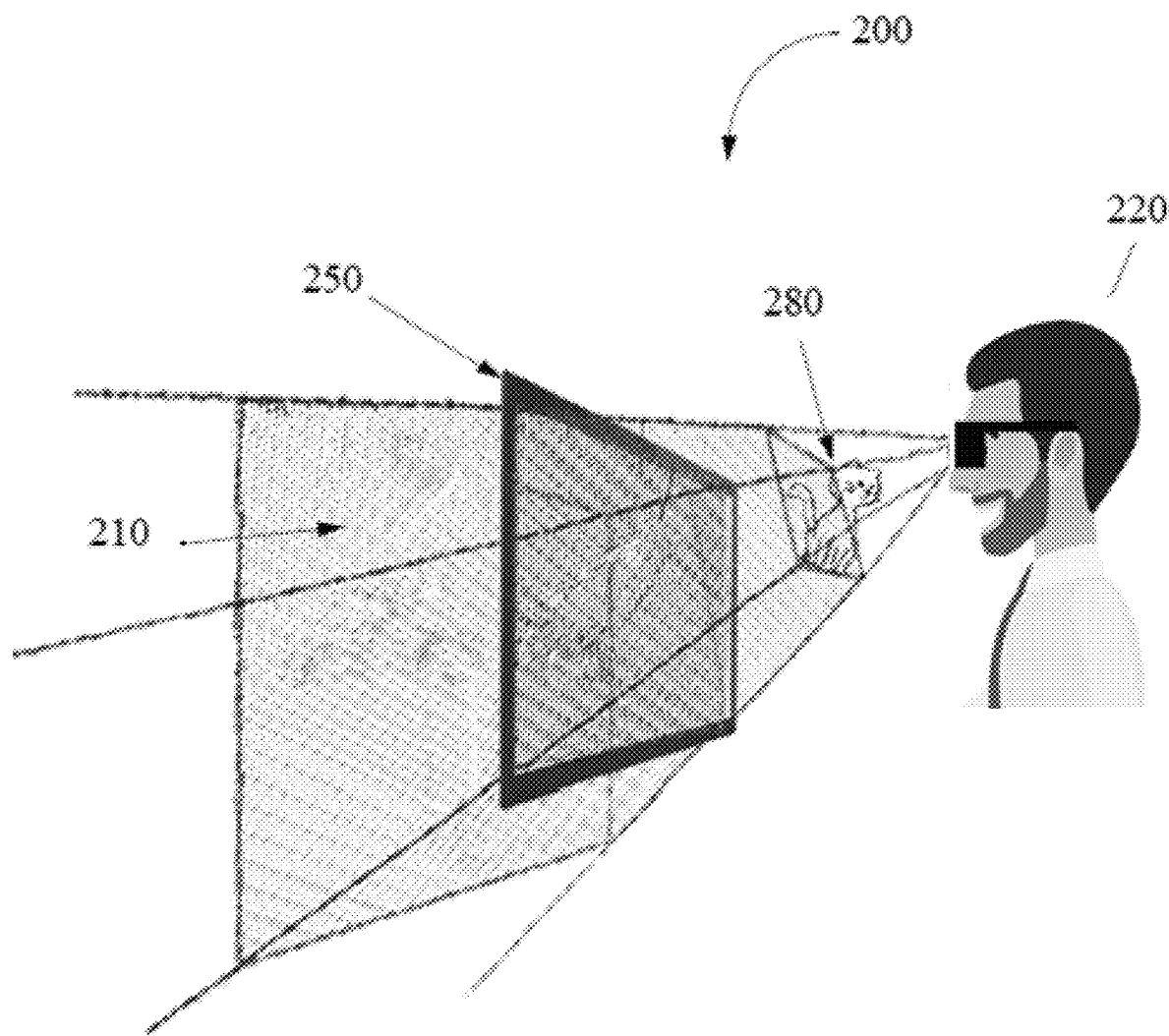
Figure 8C:
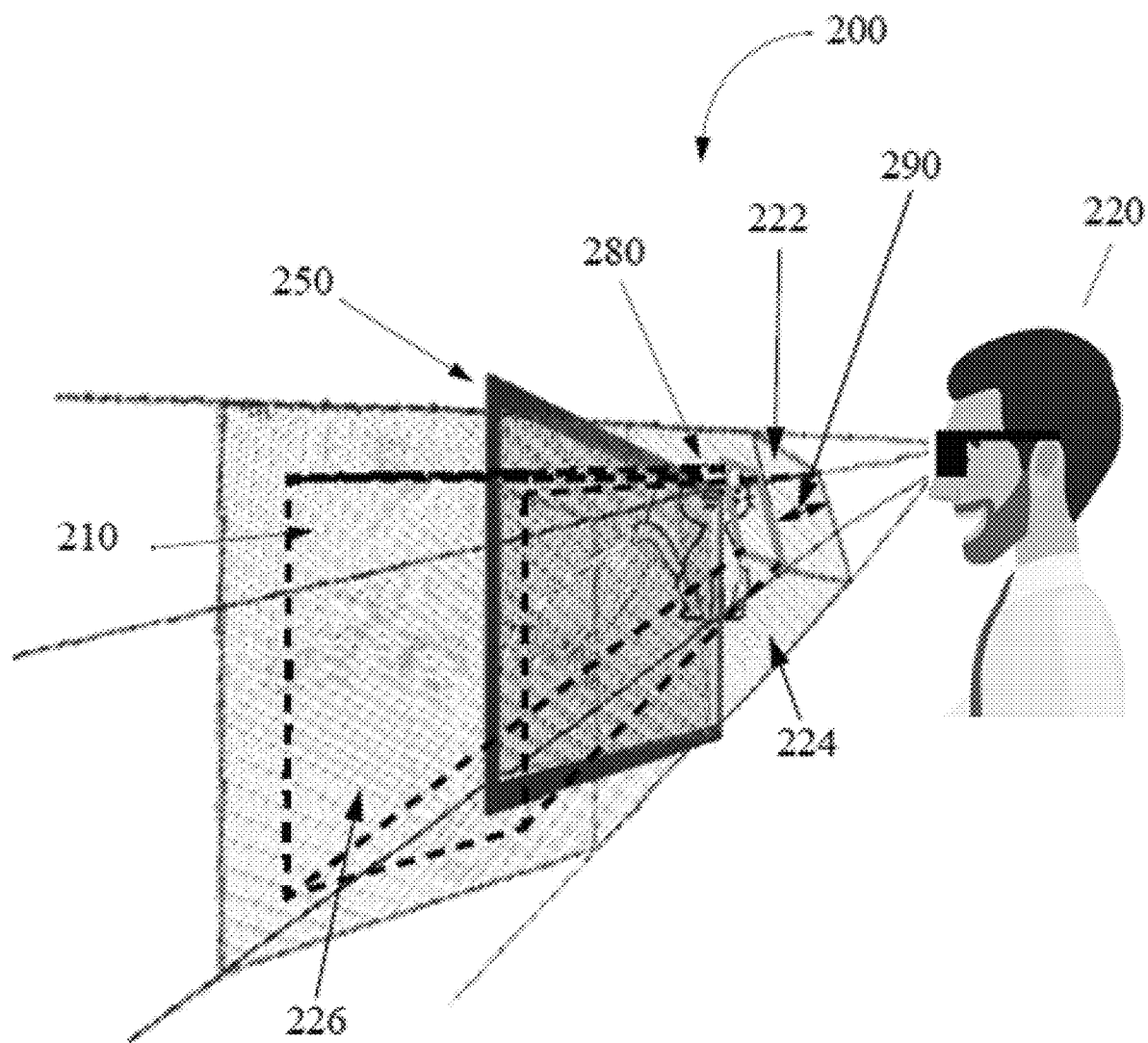

Thus, as shown in FIG. 8A, the functional unit of 3D stereoscopic display system 200 may be configured to display content 280 at a first position in the virtual 3D space relative to eyepoint, or point of view, of user 220. Note that the first position may correspond to a position within the stereo comfort fuse zone as illustrated. In certain embodiments the functional unit may be configured to determine that content 280, or a portion of content 280, is not contained, or is not completely within, the stereo comfort fuse zone 220, as shown in FIG. 8B. In some embodiments, the functional unit may be configured to determine that the content 280, or a portion of content 280, is within a specified distance, such as distance 290, from a boundary, such as boundaries 222-226 (note that not all boundaries are labeled) of the stereo comfort fuse zone 220, as shown in FIG. 8C.

Field of Focus

For an eye fixation distance of 0.5 m, the total depth of field would range from a distance of about 0.1 m in front of fixation to about 0.17 m behind fixation. For a fixation distance of 1 m, the total depth of field would range from a distance of about 0.33 m in front of fixation to about 1.0 m behind fixation. For a fixation distance of 2 m, the total depth of field would range from a distance of about 1 m in front of fixation to an infinite distance behind fixation.

The depth of field refers to the interval in depth over which a stimulus remains in focus and the accommodative response would not be differentially stimulated in a direct way. The depth of field varies according to fixation distance: the eye can tolerate much larger intervals of depth when those intervals are viewed from a far distance, but is challenged when they are viewed from a near distance before an image goes out of focus. Converging or diverging away from the display surface may pull accommodation to that position in depth, but if that position is within the depth of field, then the images of the stimulus on the display surface will still be in focus and the accommodative response would not be driven back to the display. A conflict between accommodative and vergence responses should not occur if the images on the display surface remain within the observer's depth of field, but does occur when the images on the display surface does not remain within the observer's depth of field.

The total depth of focus is on the order of 0.66 diopter (D) for a 1-arcmin acuity target. However, another estimate is that the average total depth of focus is on the order of 1.0 D (or, equivalently, 0.5 D in front of fixation and 0.5 D behind fixation).

In further implementations a fixation distance of 3 m, which is close to the recommended viewing distance for TVs, the total depth of field would range from 1.8 m in front of fixation to an infinite distance behind fixation. And for a fixation distance of 20 m, which is the recommended distance for viewing 3D cinema, the total depth of field would range from about 18 m in front of fixation to an infinite distance behind fixation. Thus, for 3D cinema, almost the entire viewing distance from a couple meters in front of the user to an infinite distance away-represents the usable depth interval for which accommodation-vergence conflict should not occur.

Limiting Disparity in the Far Viewing Region

There are a number of contributors enabling a user to perceive a spatial scene using a stereo display for user viewing. By using two distinct eyepoints for capturing a scene to be displayed to a user with alternate left right imagery, a stereo image is produced. When presenting objects within this imagery, where the objects depending upon the perceptual recognition of spatial variance, depth information can be presented to the user by using the disparity between the two images or at least the disparity between images of the objects within the scene. However, if the disparity is too great, that is the pixel separation is too great, the vergence to focus relationship becomes too difficult for the user to accommodate and fuse, and eye strain and headaches occur. This can occur in negative disparity, where the eyes are forced to verge in a manner that causes the eyes to cross at a rather tight convergence angle to accommodate an object closer than the focal plane, and can occur in positive disparity, where the eyes are forced to verge in a manner that causes the eyes to cross at a rather wide convergence angle approaching parallel view or beyond parallel views, to accommodate an object farther than the focal plane.

By limiting the positive and/or negative disparity, eye strain and headaches can be reduced. One technique is to move the object to be within the stereo comfort fuse zone. However this technique is not appropriate when viewing a scene where the objects are to have a positional relationship to each other as dictated by the data feeding the scene. In these situations where the spatial integrity must be kept, rearranging objects within the scene is not permitted. Instead other techniques to limit the disparity can be used.

In particular, portions of the virtual scene that are inside the stereo comfort fuse zone can be projected onto the render plane with one type of projection, e.g., perspective projection. In contrast, portions of the virtual scene that are outside the stereo comfort fuse zone can be projected onto the render plane with a different type of projection, e.g., orthographic projection, that does not result in creation of virtual objects outside the stereo comfort fuse zone.

Figure 9:
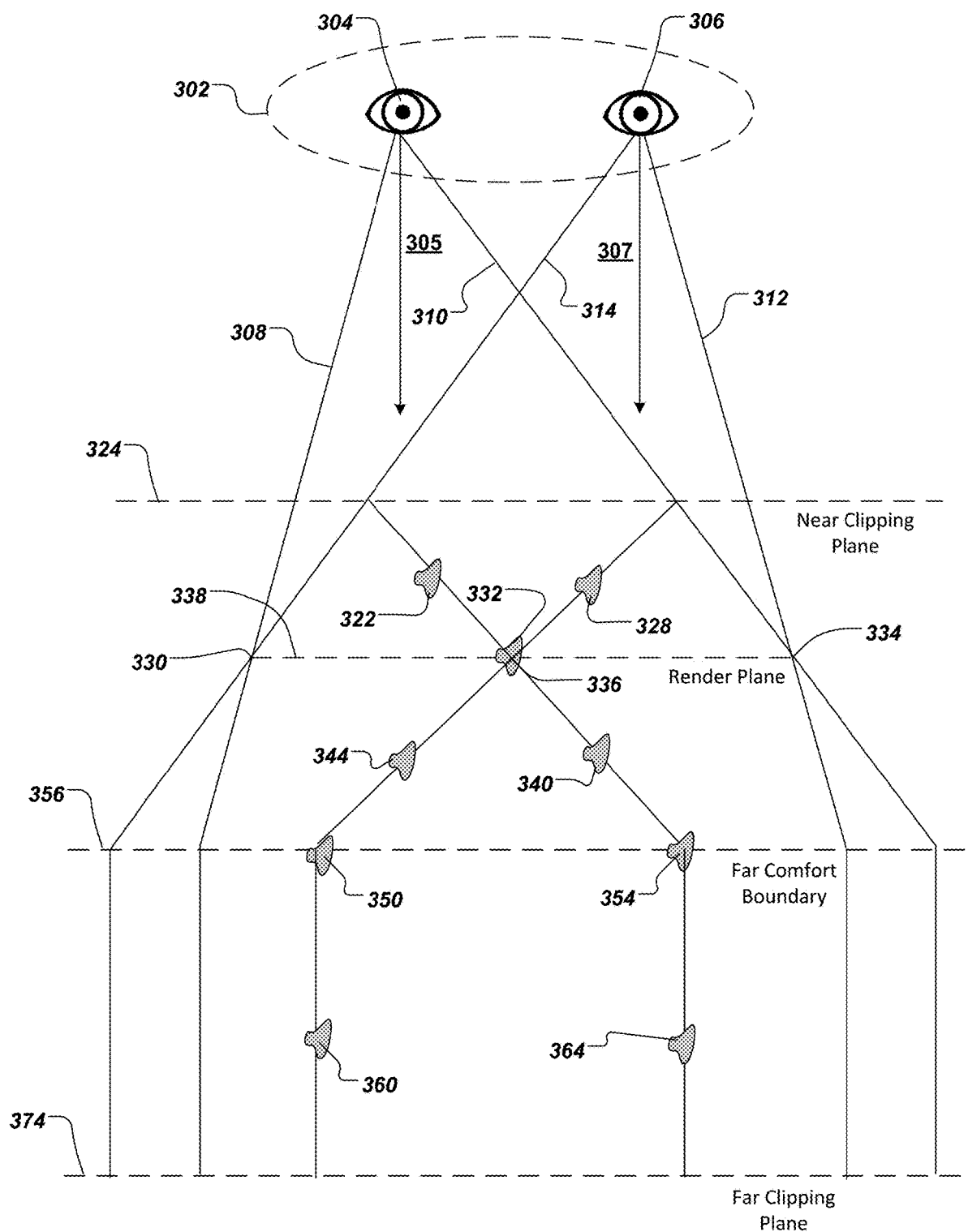
FIG. 9 presents a typical central perspective rendering providing an exemplary viewpoint for a stereo paired eyepoint offset rendering in accordance with the invention.

It should be noted that the embodiment of FIG. 9 is exemplary only, and other numbers of projection renderings are envisioned.

FIG. 9 illustrates a typical central perspective rendering. FIG. 9 provides an exemplary viewpoint for a stereo paired eyepoint offset rendering with the right eye eyepoint 304 and the left eye eyepoint 306 within a virtual space including the view of a graphic object that is within the frustum defined by the near clipping plane 324 and far clipping plane 374. Objects beyond the far clipping plane 374 need not be rendered. The defined view region as seen by the right eyepoint 304 is bounded by the frustum edges 308 and 310. The defined view region as seen by the left eyepoint 306 is bounded by the frustum edges 312 and 314. The display or render plane 338 is shown for a normal perspective rendering, but could be modified for any oblique perspective rendering. The defined left and right eye frustums 305, 307, are the regions within which one or more objects are to be rendered for imaging on to a stereo display device. The render plane 338 can be coincident with the screen of the display devices. Within the region between the near clipping plane 324 and far comfort boundary 356, i.e., the first far clipping plane, virtual objects can be rendered onto the render plane 338 374 using a perspective projection.

The FIG. 9 shows the mechanism for graphic object projection onto the image plane for a graphic object that is moved from one position within the frustums to another. FIG. 9 shows a cross section of such a frustum with the two side 308-310 and 312-314 for the right eye and left eye view points and with the near clipping plane 324 and far clipping plane 374 shared by both. These frustums 305, 307 facilitate the projection of points from the left and right eyepoints (306 and 304) to the render plane 338. The right eye and left eye frustums 305, 307 pass to the edge of the render plane 338 at points 330 and 334. It is at these edges of the render plane that the two right and left frustums cross each other.

Assuming a virtual object 332 is placed within the right eye frustum at the center of the display view 338 at location 336, the same virtual object 332 is similarly placed within the left eye frustum at the center of the render plane 338 at location 336. With the object sharing the same place within each of the right and left frustum 305, 307 and at the render plane 338, this is the zero parallax point, meaning that there is no disparity between the imagery of the virtual object as seen by a user on the display device.

As the virtual object is moved towards the user 302, while maintaining a position half way between the right eye 304 and left eye 306, the position within each right eye frustum and left eye frustum shifts. Supposing the virtual object is placed within the scene halfway between the render plane 338 and the near clipping plane 324 at location 328 for the right eye frustum 305 and the between the render plane 338 and the near clipping plane 324 at location 322 for the left eye frustum 307. The position of the virtual object within the two distinct frustums characterize how the user perceives the position of the object in space. With the positions 322 and 328, the disparity is such that the right and left eyes 304, 306 converge on the virtual object ahead of (in front of) the display plane (negative parallax), though the accommodation of the user's eyes are still at the display plane 338. This creates the illusion that the object is seen closer to the user than when the object was at zero parallax.

As the virtual object is moved away from the user 302, while maintaining a position half way between the right eye 304 and left eye 306, the position within each right eye frustum and left eye frustum shifts. In one embodiment the virtual object is placed within the scene between the render plane 338 and the far clipping plane 374 at location 344 for the right eye frustum 305 and the between the render plane 338 and the far clipping plane 374 at location 340 for the left eye frustum 307. The position of the virtual object within the two distinct frustums characterizes how the user perceives the position of the object in space. With the positions 340 and 344, the disparity is such that the right and left eyes 304, 306 converge on the virtual object beyond (behind) the display plane (positive parallax), though the accommodation of the user's eyes are still at the display plane 338. This creates the illusion that the object is seen further away from the user than when the object was at zero parallax.

As the virtual object is moved away from the user 302 half way between the right eye 304 and left eye 306, the position within each right eye frustum and left eye frustum shifts. Assuming the virtual object is placed within the scene at a location near a far comfort boundary 356, which is at location 350 for the right eye frustum 305 and a location 354 for the left eye frustum 307, the position of the virtual object within the two distinct frustums characterizes how the user perceives the position of the object in space. With the positions 354 and 350, the disparity is such that the right and left eyes converge on the virtual object beyond (behind) the display plane (positive parallax), though the accommodation of the user's eyes are still at the display plane. This creates the illusion that the object is seen further away from the user than when the object was at zero parallax.

However at this point, the focus accommodation/convergence is at a transition plane beyond which, if the virtual object is placed further away from the user in the scene, the disparity that separates 350 from 354 is such that the user's recognition of the spatial positioning as seen in the angles of each of the user's left and right eyes are out of synchronization of where the user expects to accommodate their eyes. Another way of expressing this is that the eyes convergence angle and the eye's focal points are not synchronized in relation to looking at natural objects. This results in eye strain. This transition plane is identified as the far boundary 356 of the stereo comfort fuse zone. That is, before the boundary 356 is the user stereo comfort fuse zone, and after the boundary 356 is a region which is outside the stereo comfort fuse zone.

In many activities, it is necessary to review a scene where one or more virtual object will be beyond a first far clipping plane (the far comfort stereo plane) 356. The virtual object can extend beyond the far comfort stereo plane 356 to a second far clipping plane 374. However virtual objects in this region between the first far clipping plane 356 and the second far clipping plane 374 would create eye strain and headaches on the part of the user viewing these objects on a stereo display device. This strain would be caused by the disparity between the left and right eye view, where the disparity value exceeds a value that is deemed comfortable for the user.

The location of the far comfort stereo plane 356 can be identified based on a number of contributing factors, which may include the user's inter-pupil distance, the size of the virtual object within the scene, the contrast and ghosting performance of the stereo display device, the size/shape/orientation of the stereo display device, the distance between the user's eyes and the focal surface of the display device, the ambient lighting, the depth of focus of the user, and the user's focal point within the scene. The far comfort stereo plane 356 may be empirically derived, algorithmically derived, assigned by a user, assigned by a scene creator, be a constant, may be variable over time, may be variable based on the scene.

In one embodiment for the virtual objects that are determined to be rendered, such that the disparity between such objects or portions of those objects, is greater than that identified for the far comfort stereo plane threshold between the left and right frustum, the disparity must be capped, so the disparity does not exceed the threshold and thereby not present the virtual objects in a manner that will cause eye strain and headaches for the user.

In one embodiment, the far comfort stereo plane 356 is the transition plane between where the frustum based projection changes from a perspective projection function to an orthographic projection function.

The region between the first far clipping plane (far comfort stereo plane) 356 to the second far clipping plane is a region where the frustum establishes an function of an orthographic projection, where the projection plane is the first far clipping plane 356, but the virtual objects that are between the first far clipping plane 356 and the second far clipping plane 374 are projected as an orthographic like projection, with the first far clipping plane 356 being the render plane for each of the right eye orthographic frustum and the left eye orthographic frustum.

In one embodiment, a virtual object 360 rendered within the right eye orthographic frustum and the virtual object 364 rendered within the left eye orthographic frustum have a projection rendering with disparity between the two projections that match the disparity of the virtual objects 350 and 354 at the first far clipping plane 356 of the right eye and left eye orthographic frustums. Though a true orthographic function is not appropriate as the scale of the projected objects at any point does not change, the orthographic projection keeps the disparity the same as one projects objects beyond the far comfort stereo plane 356.

However, if one applied an X and Y scaling function to the objects being projected, the resultant projection keeps the disparity constant, though shrinks the size of the objects in both the left and right eye views concurrently providing a size relationship cue to the user, giving the appearance of distance of the objects. A typical scaling function would an inverse function. In one embodiment, the scaling function of the objects' x and y parameters would be $1/d$, where d is the relative distance in z from the far comfort stereo plane (or first far clipping plane) 356 to the object. In another implementation the scaling function of objects' x and y parameters would be $1/f(d)$ or $f(d)$, where D is the relative or absolute distance in z from the far comfort stereo plane (or first far clipping plane) 356 to the object. In another implementation, were the object is non linear in z, the scaling function would be applied to the objects' z parameters as well.

In one embodiment the two render planes for each eye, the perspective projection based render plane 338 and the orthographic projection render plane 356 are to be merged, so the display for each eye sees the combined projective and orthographic rendering. One process is to merge the two or more rendering planes based on the distal proximity to the eyepoint. The nearest render plane is superimposed on the next render plane further away. This way the scene in front is always overlaying the subsequent scene behind. This is done for each eye. This can be equivalent to orthographic projection of virtual objects that are between the far comfort boundary 356 (the first far clipping plane) and the second far clipping plane 374 onto the render plane 338.

Limiting Disparity in the Near Viewing Region

Figure 10:
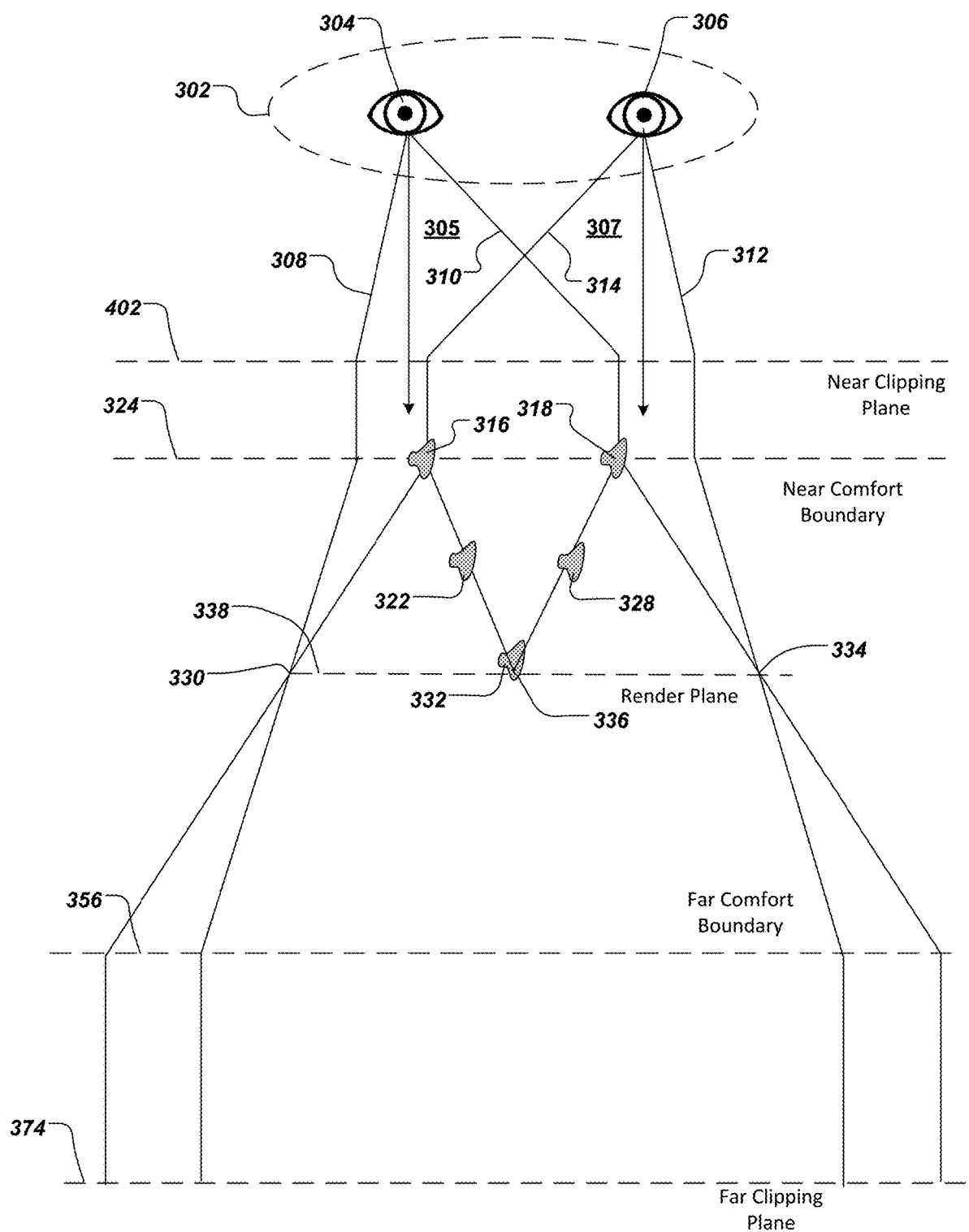
FIG. 10 presents an exemplary stereo paired eyepoint offset rendering within a virtual space including the view of a graphic object that is within the frustum defined clipping planes.

It should be noted that the embodiment of FIG. 10 is exemplary only, and other numbers of projection renderings are envisioned.

FIG. 10 illustrates another typical central perspective rendering. FIG. 10 provides an exemplary viewpoint for a stereo paired eyepoint offset rendering with the right eye eyepoint 304 and the left eye eyepoint 306 within a virtual space including the view of a graphic object that is within the frustum defined by the near clipping plane 402 and far clipping plane 374. The defined view region as seen by the right eyepoint 304 is normally bounded by the frustum edges 308 and 310. The defined view region as seen by the left eyepoint 306 is normally bounded by the frustum edges 312 and 314. The display or render plane 338 is shown for a central perspective rendering, but could be modified for any oblique perspective rendering. The defined left and right eye frustums 305, 307 are the regions within which one or more objects are to be rendered for imaging on to a stereo display device. The render plane 338 can be coincident with the screen of the display devices. Within the region between the near comfort boundary 324 and far comfort boundary 356, virtual objects can be rendered onto the render plane 338 using a perspective projection.

FIG. 10 shows the mechanism for graphic object projection onto the image plane for a graphic object that is moved from one position within the frustums to another. FIG. 10 shows a cross section of such a frustum with the two side 308-310 and 312-314 for the right eye and left eye view points and with the near clipping plane 402 and far clipping plane 374 shared by both. These frustums 305, 307 facilitate the projection of points from the left and right eyepoints (306, 304) to the render plane 338. The right eye and left eye frustums 305, 307 pass to the edge of the render plane 338 at points 330 and 334. It is at these edges of the render plane that the two right and left frustums cross each other.

Assuming a virtual object 332 is placed within the right eye frustum at the center of the display view 338 at location 336, the same virtual object 332 is similarly placed within the left eye frustum at the center of the display view 338 at location 336. With the object sharing the same place within each of the right and left frustum 305, 307 and at the render plane 338, this is the zero parallax point, meaning that there is no disparity between the imagery of the virtual object as seen by a user on the display device.

As the virtual object is moved towards the user 302, while maintaining a position half way between the right eye 304 and left eye 306, the position within each right eye frustum and left eye frustum shifts. Supposing the virtual object is placed within the scene partial way between the render plane 338 and the near clipping plane 402 at 328 for the right eye frustum 305 and the between the render plane 338 and the near clipping plane 402 at 322 for the left eye frustum 307. The position of the virtual object within the two distinct frustums characterize how the user perceives the position of the object in space. With the positions 322 and 328, the disparity is such that the right and left eyes 304, 306 converge on the virtual object ahead of (in front of) the display plane (negative parallax), though the accommodation of the user's eyes are still at the display plane 338. This creates the illusion that the object is seen closer to the user than when the object was at zero parallax.

As the virtual object is moved closer to the user 302, while maintain a position half way between the right eye 304 and left eye 306, the position within each right eye frustum and left eye frustum shifts. Assuming the virtual object is placed within the scene at a location approaching the near clipping plane 402, which is at location 318 for the right eye frustum and a location 316 for the left eye frustum, the position of the virtual object within the two distinct frustums characterizes how the user perceives the position of the object in space. With the positions 318 and 316, the disparity is such that the right and left eyes converge on the virtual object in front of (before) the display plane (negative parallax), though the accommodation of the user's eyes are still at the display plane. This creates the illusion that the object is seen closer to the user than when the object was at zero parallax.

However at this point, the focus accommodation/convergence is at a transition point beyond which if the virtual object is placed closer to the user in the scene, the disparity that separates 318 from 316 is such that the user's recognition of the spatial positioning as seen in the angles of each of the user's left and right eyes are out of synchronization of where the user expects to accommodate their eyes. Another way of expressing this is that the eyes convergence angle and the eye's focal points are not synchronized in relation to looking at natural objects. This results in eye strain. This transition plane is identified as the near boundary 324 of the stereo comfort fuse zone. That is, after the boundary 324 is a region which is within the user stereo comfort fuse zone, and before the boundary 324 is a region which is outside the stereo comfort fuse zone.

In many activities, it is necessary to review a scene where one or more virtual object will be closer to the user than the near comfort stereo plane 324, where the near clipping plane extends nearer the near comfort clipping plane 324 to a near clipping plane 402. However virtual objects in this region between the near comfort clipping plane 324 and the near clipping plane 402 would create eye strain and headaches on the part of the user viewing these objects on a stereo display device. This strain would be caused by the disparity between the left and right eye view, that is the converging eye pair angle, where the disparity value (converging eye pair angle) exceeds a value that is deemed comfortable for the user.

The location of the near comfort stereo plane 324 can be identified based on a number of contributing factors, which may include the user's inter-pupil distance, the size of the virtual object within the scene, the contrast and ghosting performance of the stereo display device, the size/shape/orientation of the stereo display device, the distance between the user's eyes and the focal surface of the display device, the ambient lighting, the depth of focus of the user, and the user's focal point within the scene. The far comfort stereo plane 324 may be empirically derived, algorithmically derived, assigned by a user, assigned by a scene creator, be a constant, may be variable over time, may be variable based on the scene.

In one embodiment for the virtual objects that are determined to be rendered, such that the disparity between such objects or portions of those objects, is greater than that identified for the near comfort stereo plane threshold between the left and right frustum, the disparity must be capped, so the disparity does not exceed the threshold and thereby not present the virtual objects in a manner that will cause eye strain and headaches for the user.

In one embodiment, the near comfort stereo plane 324 is the transition plane between where the frustum based projection changes from a perspective projection function to an orthographic projection function.

The region between the near clipping plane 402 to the near comfort stereo plane 324 is a region where the frustum establishes a function of an orthographic projection, where the projection plane is the near comfort stereo plane 324, but the virtual objects that are between the near clipping plane 402 and the near comfort stereo plane 324 are projected as a function of an orthographic projection, with the near comfort stereo plane 324 being the render plane for each of the right eye orthographic frustum and the left eye orthographic frustum.

In one embodiment a virtual object 412 rendered within the right eye orthographic frustum and the virtual object 410 rendered within the left eye orthographic frustum have a projection rendering with disparity between the two projections that match the disparity of the virtual objects 318 and 316 at the near comfort stereo plane 402 of the right eye and left eye orthographic frustums. Though a true orthographic function is not appropriate as the scale of the projected objects at any point does not change, the orthographic projection keeps the disparity the same as one projects objects beyond the near comfort stereo plane 324.

However, if one applied an X and Y scaling function to the objects being projected, the resultant projection keeps the disparity constant, though shrinks the size of the objects in both the left and right eye views concurrently providing a size relationship cue to the user, giving the appearance of closeness of the objects. A typical scaling function would an inverse function. In one embodiment, the scaling function of the objects' x and y parameters would be 1/d, where d is the relative distance in z from the near comfort stereo plane 324 to the object. In another implementation the scaling function of objects' x and y parameters would be 1/f(d) or f(d), where D is the relative or absolute distance in z from the near comfort stereo plane 324 to the object. In another implementation, were the object is non linear in z, the scaling function would be applied to the objects' z parameters as well.

Limiting Disparity in Near and Far Viewing Region

In one embodiment limiting the disparity means limiting the disparity in both the near and far viewing regions. In FIG. 10, the standard projections are occurring between the near comfort stereo plane 324 and the far comfort stereo plane 356 using the perspective frustum with the frustum boundary represented by each of the left and right eye frustum boundaries 312/314 and 308/310. At the junction of the near and far comfort stereo plane beyond which the user would experience eye strain and dizziness, the frustums become orthographic frustums represented by each of the left and right eye frustum boundaries 358/368 and 372/370 for the far projections regions and represented by each of the left and right eye frustum boundaries 406/416 and 418/404 for the near projections regions. The frustum boundaries merely extend orthographically in a parallel manner from the projective frustums at the near and far comfort stereo plane junction.

It should be noted than the term plane when referring to any of the near or far clipping planes or any of the near or far comfort stereo clipping planes may be conventional two dimensional planes and may be three dimensional surfaces, where the surfaces may be non-linear and may be unique for each of the left and right eye projections. It should also be noted that the projection plane or render planes may be orthogonal to the eye or camera points or may at an angle for non-central projection rendering. It should also be noted that the projection plane or render planes may be two-dimensional planes or may be a three dimensional surface, for example concave, convex, or some other function surface.

It should be noted that the orthographic projection frustum boundaries may alternatively be some other frustum boundaries that are not the projective frustum. It should also be noted that there may be a progressive change in frustum boundaries from the projective frustum to the final orthographic frustum. In this later case it may be noted that the spatial scaling of the virtual objects within this region of transitional frustums may be a gradation from the d to 1/d scaling to some gradation function during the transition region. This will occur in both the near and far comfort stereo junction regions. The projection, orthographic and any other frustum is a three dimensional frustum defining virtual objects in a three dimensional space, but for simplicity is represented in the figures as a two dimensional frustum.

The frustums characterize the projection on to a render plane, where the render plane is imaged on a computer monitor, which is a 2D surface. A 3D scene rendered must be projected onto the computer screen as a 2D image. A projection matrix is used for this projection transformation. First, it transforms all vertex data from the eye coordinates to the clip coordinates. Then, these clip coordinates are also transformed to the normalized device coordinates (NDC) by dividing with w component of the clip coordinates.

Both clipping (frustum culling) and NDC transformations are integrated into a projection matrix.

Figure 11:
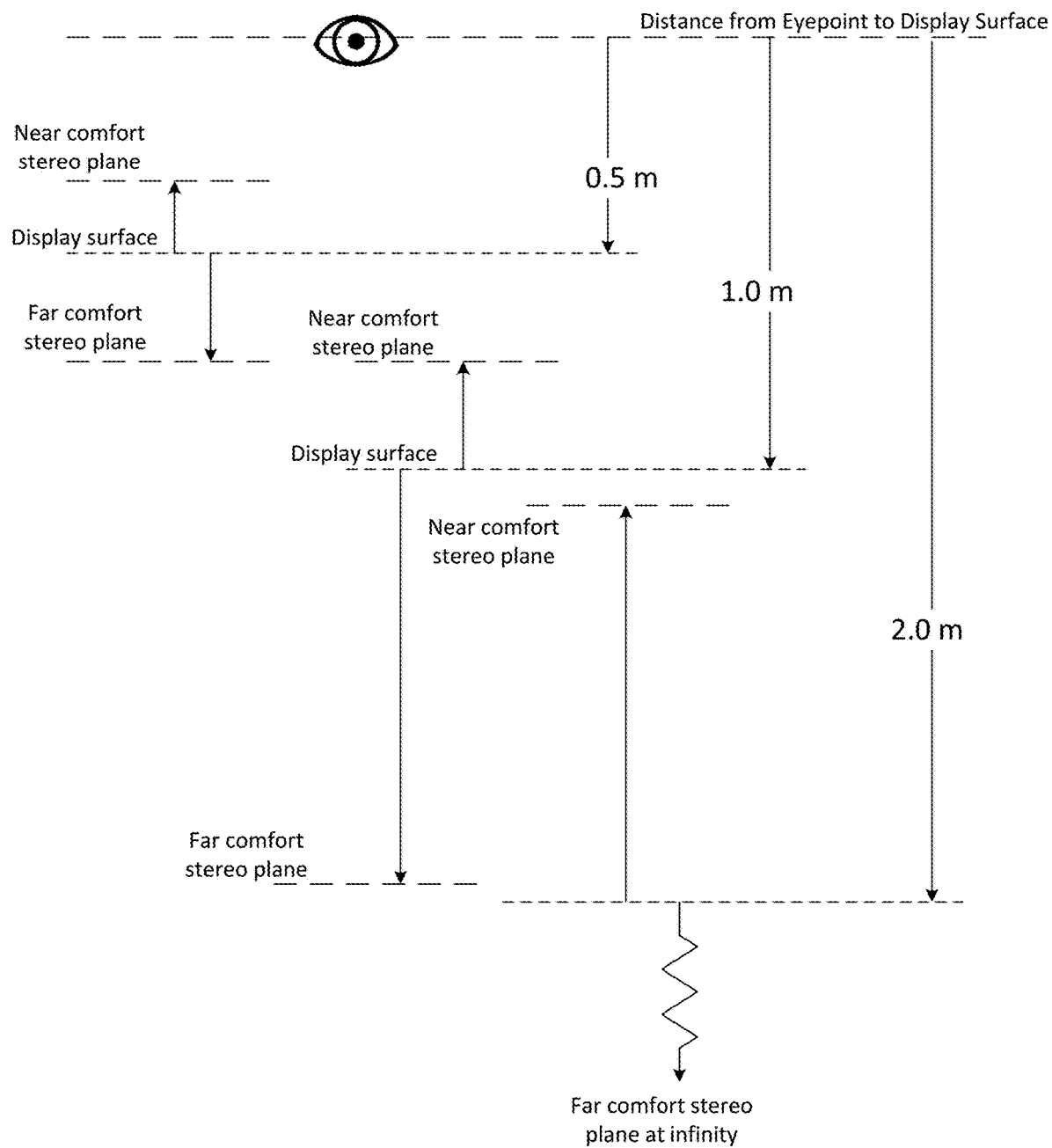
FIG. 11 presents a correlation between eyepoint distance to display screen and the comfort stereo plane regions.

FIG. 11 shows a correlation between eyepoint distance to display screen and the comfort stereo plane regions. As either the distance between the eyepoint and the display screen or as the distance between the eyepoint and the focal point to the display screen (in the event that optics are used to change the apparent location of the display screen to the eyepoint of the user), the range of the near and far comfort display plane changes. The FIG. 11 merely shows three examples of possible display screen distance to eyepoint and their associated near and far comfort display plane regions, but there are many a possible distances between the eyepoint and display screen with corresponding near and far stereo comfort display planes and hence regions. As shown in FIGS. 9 and 10, given the near and far clipping plane of the frustum employed, the spatial determination of the left and right eyepoint near and far stereo comfort planes must be determined. This determination is based upon the determined eyepoint to display screen that correlates to the eyepoint to render plane in the graphic space of the frustum, then applying the appropriate near and far comfort display planes to determine the frustum projection matrix, where the frustum projection matrix may be a complex matrix accommodating the standard projection matrix of the stereo comfort regions plus the one or more orthographic (plus depth function) of the spatial regions before and/or beyond the stereo comfort display planes.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer program product, tangibly embodied in a non-transitory computer readable medium, comprising instructions to cause one or more processors to:

receive data representing a 3D virtual scene including a plurality of virtual objects positioned within the scene;

receive data indicating first and second eyepoints;
for each of one or more of the plurality of virtual objects in the 3D virtual scene,
receive data indicating a degree of disparity between corresponding positions for the virtual object within the scene as rendered stereoscopically for the first and second eyepoints by projection onto a projection surface using a first projection type;
dynamically generate a stereoscopic image of the 3D virtual scene, wherein the instructions to generate the stereoscopic image comprise instructions to, for each of the one or more virtual objects of the plurality of virtual objects in the 3D virtual scene,
determine whether the degree of disparity of the virtual object satisfies a threshold;
in response to determining that the degree of disparity does not satisfy the threshold, render the virtual object according to the first projection type; and
in response to determining that the degree of disparity does satisfy the threshold following a change in relative position of the virtual object and the eyepoints,
update the projection type for rendering the virtual object from the first projection type to a different, second projection type, and
render the virtual object according to the second projection type; and
display the stereoscopic image on a stereoscopic display.

2. The computer program product of claim 1, further comprising instructions to cause the one or more processors to:
render the 3D virtual scene using the first projection type.

3. The computer program product of claim 2, further comprising instructions to cause the one or more processors to, for each of the one or more virtual objects of the plurality of virtual objects in the 3D virtual scene:
in response to determining that the degree of disparity of the virtual object does satisfy the threshold, perform a projection transform on the virtual object.

4. The computer program of claim 1, wherein determining whether the degree of disparity of a virtual object satisfies a threshold includes determining that a positive disparity of the virtual object satisfies a threshold.

5. The computer program of claim 1, wherein determining whether the degree of disparity of a virtual object satisfies a threshold includes determining that a negative disparity of the virtual object satisfies a threshold.

6. The computer program product of claim 1, where the threshold is determined by one or more of: a user's interpupil distance, virtual object size, stereo display device contrast/ghosting/size/shape/orientation, ambient lighting, the user's depth of focus, or the user's focal point.

7. The computer program product of claim 1, wherein the first projection type is a perspective projection.

8. The computer program product of claim 7, wherein the perspective projection is a normal perspective projection.

9. The computer program product of claim 7, wherein the perspective projection is an oblique perspective projection.

10. The computer program product of claim 1, wherein the second projection type is an orthographic projection.

11. The computer program product of claim 10, wherein the orthographic projection includes a transform function.

12. The computer program product of claim 11, wherein the transform function comprising a scaling function.

13. The computer program product of claim 1, wherein the data indicating the degree of disparity for a virtual object indicates pixels of separation.

14. The computer program product of claim 1, wherein the data indicating the degree of disparity for a virtual object indicates degrees of angular separation.

15. A method of stereoscopic display, comprising:
receiving data representing a 3D virtual scene including a plurality of virtual objects positioned within the scene;
receiving data indicating first and second eyepoints;
for each of one or more of the plurality of virtual objects in the 3D virtual scene,
receiving data indicating a degree of disparity between corresponding positions for the virtual object within the scene as rendered stereoscopically for the first and second eyepoints by projection onto a projection surface using a first projection type;
dynamically generating a stereoscopic image of the 3D virtual scene, comprising, for each of the one or more virtual objects of the plurality of virtual objects in the 3D virtual scene,
determining whether the degree of disparity of the virtual object satisfies a threshold;
in response to determining that the degree of disparity does not satisfy the threshold, rendering the virtual object according to the first projection type; and
in response to determining that the degree of disparity does satisfy the threshold following a change in relative position of the virtual object and the eyepoints,
updating the projection type for rendering the virtual object from the first projection type to a different, second projection type, and
rendering the virtual object according to the second projection type; and
displaying the stereoscopic image on a stereoscopic display.

16. The method of claim 15, wherein the first projection type is a perspective projection.

17. The method of claim 15, wherein the second projection type is an orthographic projection.

18. A stereoscopic display system, comprising:
at least one display screen configured to display a stereoscopic image;
one or more processors; and
a non-transitory computer readable medium comprising instructions to cause the one or more processors to
receive data representing a 3D virtual scene including a plurality of virtual objects positioned within the scene;
receive data indicating first and second eyepoints;
for each of one or more of the plurality of virtual objects in the 3D virtual scene,
receive data indicating a degree of disparity between corresponding positions for the virtual object within the scene as rendered stereoscopically for the first and second eyepoints by projection onto a projection surface using a first projection type;
dynamically generate a stereoscopic image of the 3D virtual scene, wherein the instructions to generate the stereoscopic image comprise instructions to, for each of the one or more virtual objects of the plurality of virtual objects in the 3D virtual scene,
determine whether the degree of disparity of the virtual object satisfies a threshold;
in response to determining that the degree of disparity does not satisfy the threshold, render the virtual object according to the first projection type; and in response to determining that the degree of disparity does satisfy the threshold following a change in relative position of the virtual object and the eye-points,
update the projection type for rendering the virtual object from the first projection type to a different, second projection type, and
render the virtual object according to the second projection type; and
display the stereoscopic image on a stereoscopic display.

19. The system of claim 18, wherein the first projection type is a perspective projection.

20. The system of claim 18, wherein the second projection type is an orthographic projection.

\* \* \* \* \*